(12) United States Patent
Fukuyo et al.

(10) Patent No.: US 7,837,874 B2
(45) Date of Patent: Nov. 23, 2010

(54) TREATMENT SYSTEM FOR SHIPS' BALLAST WATER

(75) Inventors: Yasuwo Fukuyo, Tokyo (JP); Takeaki Kikuchi, Tokyo (JP); Jun Waki, Tokyo (JP); Seiji Kino, Saga (JP); Kazunobu Hirao, Hiroshima (JP); Katsumi Yoshida, Tokyo (JP); Izumi Ohnishi, Tokyo (JP); Masahiro Saito, Tokyo (JP)

(73) Assignees: The Japan Association of Marine Safety, Tokyo (JP); M.O. Marine Consulting, Ltd., Tokyo (JP); Shinko Ind, Ltd., Hiroshima (JP); Laboratory of Aquatic Science Consultant Co., Ltd., Tokyo (JP); Mitsui Engineering & Shipbuilding Co., Ltd., Tokyo (JP)

( * ) Notice: Subject to any disclaimer, the term of this patent is extended or adjusted under 35 U.S.C. 154(b) by 0 days.

(21) Appl. No.: 11/979,911

(22) Filed: Nov. 9, 2007

(65) Prior Publication Data

US 2008/0142423 A1 Jun. 19, 2008

Related U.S. Application Data

(63) Continuation of application No. PCT/JP2006/309510, filed on May 11, 2006.

(30) Foreign Application Priority Data

May 11, 2005 (JP) ............................. 2005-139152

(51) Int. Cl.
*C02F 1/78* (2006.01)
*C02F 9/04* (2006.01)
*C02F 9/08* (2006.01)

(52) U.S. Cl. .................... 210/209; 210/242.1; 210/258; 210/259; 210/931

(58) Field of Classification Search ................. 210/749, 210/758, 760, 764, 198.1, 172.1, 172.2, 172.3, 210/200, 201, 202, 242.1, 252, 254, 258, 210/259, 931, 173, 174, 498, 499, 416.1; 366/126, 137, 163.1, 163.2, 176.1, 182.1, 366/182.2, 76.1, 326, 340; 261/DIG. 42, 261/75; 435/259, 6.13; 241/2
See application file for complete search history.

(56) References Cited

U.S. PATENT DOCUMENTS 3,565,404 A * 2/1971 Reid et al. ................... 366/137

(Continued)

FOREIGN PATENT DOCUMENTS

JP 63-100995 5/1988

(Continued)

OTHER PUBLICATIONS

Machine translation of JP 2003-200156, 2003 (foreign language copy cited by applicant on IDS).*

(Continued)

*Primary Examiner*—Matthew O Savage
*Assistant Examiner*—Lucas Stelling
(74) *Attorney, Agent, or Firm*—Duane Morris LLP

(57) ABSTRACT

A water treatment system to be installed in a tanker or other cargo ship for destruction of aquatic organisms and microorganisms that may be contained in the water, usually seawater, being pumped into the ship's ballast tank or tanks. Included is a ballast pump having an intake conduit for drawing water from the sea, and a delivery conduit for delivering the water under pressure to the ballast tank. The delivery conduit has mounted therein a slitted or otherwise open-worked screen for mechanically killing the aquatic lifeforms contained in the water by shearing action. For chemical treatment, on the other hand, part of the water being delivered by the ballast pump is bypassed into an ozone impregnator thereby to be impregnated with ozone from an ozonizer. A bypass pump repressurizes the ozone-impregnated water for returning the same into the delivery conduit.

1 Claim, 9 Drawing Sheets

U.S. PATENT DOCUMENTS

| | | | | | |
|---|---|---|---|---|---|
| 5,059,317 | A | * | 10/1991 | Marius et al. | 210/202 |
| 6,106,731 | A | * | 8/2000 | Hayes | 210/760 |
| 2003/0015481 | A1 | | 1/2003 | Eidem | |

FOREIGN PATENT DOCUMENTS

| | | | | |
|---|---|---|---|---|
| JP | 2003-200156 | | | 7/2003 |
| JP | 2003200156 | A | * | 7/2003 |
| JP | 2004-160437 | | | 6/2004 |

OTHER PUBLICATIONS

"Summary of Convention Requirements." International Convention for the Control and Management of Ships Ballast Water and Sediments. Feb. 13, 2004. Global Ballast Water Management Programme. Feb. 25, 2008 < http://globallast.imo.org/mepc.htm>.

International Search Report, Aug. 4, 2006, for International Application No. PCT/JP2006/309510.

* cited by examiner

TREATMENT SYSTEM FOR SHIPS' BALLAST WATER

This application is a continuation of International Application No. PCT/JP2006/309510, filed on May 11, 2006, which claims priority to Japanese Patent Application No. 2005-139152, filed on May 11, 2005, the entire disclosures of which are hereby incorporated by reference.

TECHNICAL FIELD

Disclosed embodiments relate to systems for treatment of ships' ballast water and pertains more specifically to a treatment system that combines mechanical treatment to kill organisms by cavitation and shearing action of the water and chemical treatment of sterilization by ozone impregnation.

BACKGROUND

Tankers and other cargo ships are furnished with ballast tanks for weighting and/or balancing the ship. The ballast tanks are filled with water when the ship is not loaded with oil or other cargo, and emptied when the ship is loaded. Thus is the buoyancy of the ship readjusted for optimal stability both when it carries cargo and when it does not.

Ballast water, essential as above for the safety of seagoing vessels, is normally the seawater taken in at the source ports where they are unloaded of their cargo. It is estimated that, worldwide, as much as well over 10,000,000,000 tons of seawater is being used annually for ballasting ships.

One of the most serious threats to the world's oceans today arises from the fact the ballast water being carried by ships unavoidably contains a variety of aquatic lifeforms which inhabited the area where the water was taken in. As the ships traverse the oceans, so do the organisms contained in their ballast water, eventually to be released into non-native environments upon discharge of the ballast water at the destination ports. Some invasive ones of these organisms may destroy and replace the native species in their new host environments.

In the light of such hazards to ecosystems caused by ballast water, a diplomatic conference at International Maritime Organization (IMO) adopted the International Convention for the Control and Management of Ships' Ballast Water and Sediments (hereinafter referred to as the Convention). The Convention requires all ships constructed in and after 2009 to implement a Ballast Water and Sediment Management Plan.

The ballast water performance standards of the Convention require that ships conducting ballast water management shall discharge:

TABLE 1

| Items | | Ballast Water Quality Criteria | Size |
|---|---|---|---|
| Aquatic Organisms | | 10 unit/ml | 10-50 µm |
| Aquatic Organisms | | 10 unit/m$^3$ | 50 µm or more |
| Indicator Microbes | *Escherichia Coli* | 250 cfu/100 ml | / |
| | *Vibrio cholerae* (O1 and O139) | 1 cfu/100 ml | / |
| | Genus *Enterococcus* | 100 cfu/100 ml | / |

In short the ballast water performance standards require that the concentrations of viable organisms in ballast water should be reduced to approximately one hundredth of those in outer oceans. The advent of technologies that meet these stringent IMO standards have been awaited in the shipbuilding industry.

Japanese Unexamined Patent Publication No. 2003-200156 represents a conventional method of ballast water treatment. It teaches to pump the water into and through a slitted screen with a view to the mechanical destruction of the sealife contained. Although effective to a limited extent for incapacitating aquatic organisms in general, this known method does not work with microorganisms and so fails to come up to the IMO ballast water performance standards.

It might be contemplated to compensate for this weakness of the conventional method above by introduction of ozone into ballast water. Ozone introduction into the ballast water being pumped under high pressure has its own difficulties that must be overcome. The ballast pump in use must be capable of developing a pressure of 1.5 megapascals (MPa) or so in consideration of both the pressure loss ΔP of 0.5-1.0 MPa as the water travels through the slitted screen and the delivery pressure of 0.2-0.4 MPa needed for charging water into the ballast tanks.

Ozone generators or ozonizers available today, on the other hand, have a delivery pressure of 0.2 MPa at the maximum. Direct ozone introduction into the ballast water being pumped toward the ballast tanks is difficult because of the much higher delivery pressure of the ballast pump. An increase of the ozone introduction pressure to the required level would make the installation costs inordinately high.

SUMMARY

The presently disclosed embodiments aim at the provision of an improved ballast water treatment system which combines the mechanical destruction of aquatic organisms with the chemical removal of microorganisms by ozone introduction, with the installation costs kept at a minimum for the effectiveness obtained.

Briefly, one aspect of the disclosed embodiments concerns a water treatment system for destruction of aquatic organisms and microorganisms that may be contained in water being pumped into a ship's ballast tank. The system includes a ballast pump having an intake conduit for drawing water possibly containing aquatic species from a source thereof and a delivery conduit for delivering the water under pre-scribed pressure to a ballast tank. An open-worked screen is mounted in the delivery conduit for killing the aquatic species contained in the water by creating shearing action in the water flowing therethrough. Branching off from the delivery conduit, a bypass conduit directs part of the water being delivered by the ballast pump into ozone impregnator means after reducing the water pressure by a pressure regulator. After being impregnated with ozone, the bypassed water is repressurized by a bypass pump and returned to the delivery conduit.

Another aspect concerns a water treatment system including: (a) a ballast pump having an intake conduit for drawing water containing aquatic species from a source thereof and a delivery conduit for delivering the water under prescribed pressure to a ballast tank; (b) an open-worked screen in the delivery conduit for killing the aquatic species contained in the water by creating shearing action in the water flowing therethrough; (c) a bypass conduit branching off from the intake conduit to permit inflow of part of the water being drawn by the ballast pump; (d) ozone impregnator means for impregnating with ozone the water flowing through the bypass conduit; and (e) a bypass pump for returning the ozone-impregnated water into the delivery conduit.

Still another aspect concerns a water treatment system including: (a) a ballast pump having an intake conduit for drawing water containing aquatic species from a source thereof and a delivery conduit for delivering the water under prescribed pressure to a ballast tank; (b) an open-worked screen in the delivery conduit for killing the aquatic species contained in the water by creating shearing action in the water flowing therethrough; and (c) an ozonizer for introducing ozone into the delivery conduit downstream of the open-worked screen in order to impregnate with ozone the water that has traversed the open-worked screen.

A further aspect concerns a water treatment system comprising: (a) a ballast pump having an intake conduit for drawing water containing aquatic species from a source thereof and a de-livery conduit for delivering the water under prescribed pressure to a ballast tank; (b) an open-worked screen in the delivery conduit for killing the aquatic species contained in the water by creating shearing action in the water flowing therethrough; and (c) an ozonizer for introducing ozone into the intake conduit in order to impregnate with ozone the water being drawn by the ballast pump.

The presently disclosed embodiments make possible the impregnation of ballast water with ozone without adding much to installation costs and so realizes the destruction of not only relatively large aquatic species but microorganisms, too.

BRIEF DESCRIPTION OF THE DRAWINGS

Various aspects of the disclosed embodiments will be or become apparent to one with skill in the art by reference to the following detailed description when considered in connection with the accompanying exemplary non-limiting embodiments, wherein.

DETAILED DESCRIPTION

Figure 1:
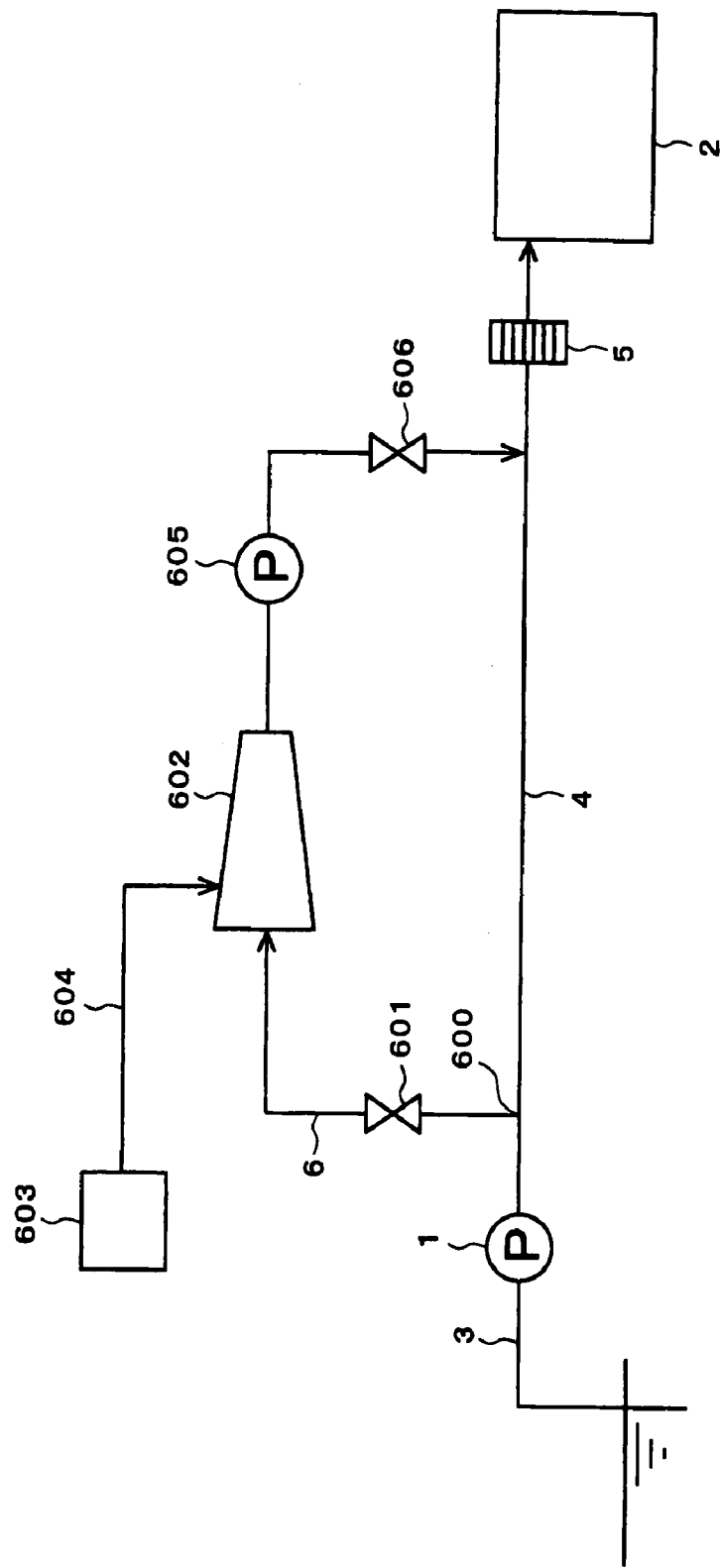
FIG. 1 is a schematic hydraulic diagram of the ballast water treatment system embodying the principles of various embodiments.

Various embodiments will now be described more specifically as embodied in the ballast water treatment system diagramed in FIG. 1 of the attached drawings. The treatment system includes a ballast pump 1 for charging water into a ballast tank or tanks 2. The ballast pump 1 has coupled thereto an intake conduit 3 for drawing water from its source and a delivery conduit 4 for delivering the water under pressure into the ballast tank 2.

It is understood that the ballast water to be treated according to disclosed embodiments may be either seawater or fresh water. Whichever is in use, the unprocessed ballast water may contain aquatic organisms as typified by phytoplankton and zooplankton, as well as microorganisms.

Figure 2:
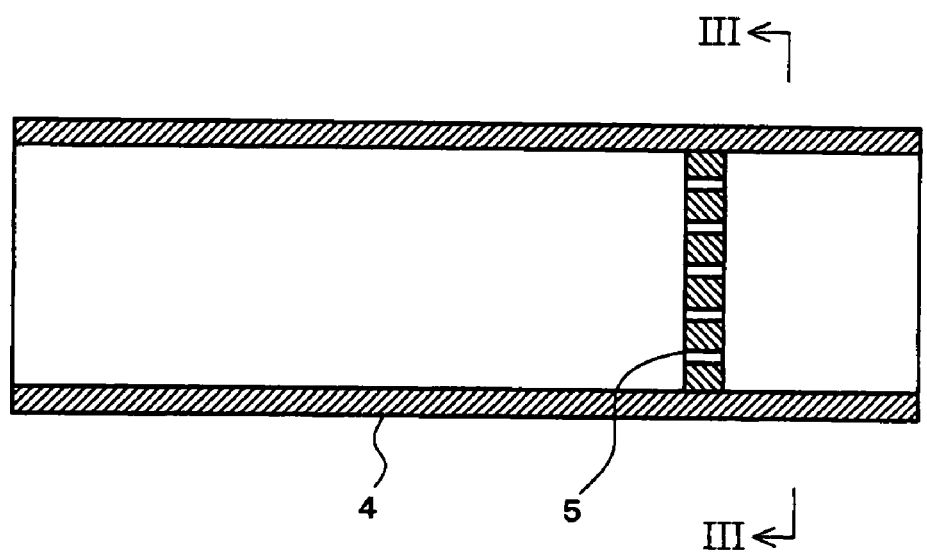
FIG. 2 is a partial, axial section through the delivery conduit of the ballast pump used in the treatment system of FIG. 1, showing in particular the open-worked screen installed in the delivery conduit.
Figure 3:
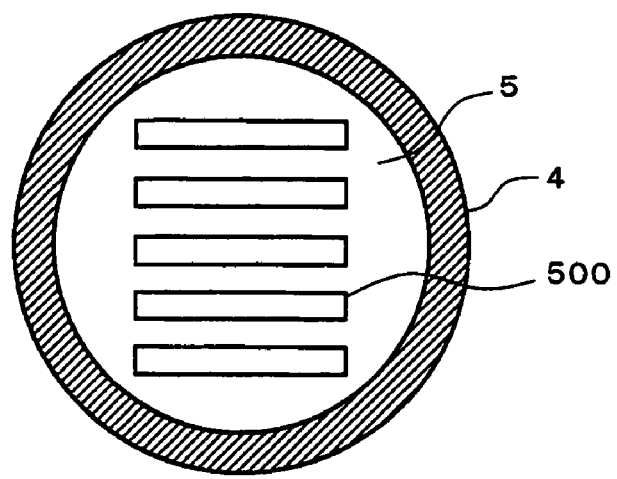
FIG. 3 is a section taken along the line III-III in FIG. 2 and looking toward the open-worked screen.

At 5 is indicated an open-worked screen installed in the delivery conduit 4 for mechanically destroying the aquatic species. The construction of the open-worked screen 5 will be better understood from an inspection of FIGS. 2 and 3. FIG. 2 is an axial sectional view of part of the delivery conduit 4 and of the open-worked screen 5 installed therein, and FIG. 3 is a cross-sectional view of the delivery conduit 4 taken along the line III-III in FIG. 2 and looking toward the open-worked screen.

It will be observed from these figures that the open-worked screen 5 has formed therein a plurality of slits 500 in parallel spaced relationship to one another. The slits 500 may have their width determined with a view to most effective destruction of the marine species traveling therethrough. Preferably, each slit 500 may be approximately 200-500 micrometers wide.

Forced through the delivery conduit 4 by the ballast pump 1, the ballast water will flow turbulently through the narrow slits 500 in the screen 5, with consequent creation of shearing action in the water. It is by the forces of this shearing action of the water that the slitted or otherwise open-worked screen 5 destroys the lifeforms contained therein.

The ballast pump 1 must be capable of developing a sufficient pressure for urging water into the ballast tank 2 via the open-worked screen 5. Since the open-worked screen 5 invites a pressure loss $\Delta P$ of 0.5-1.0 MPa, and since a pump pressure of 0.2-0.4 MPa is needed for filling the ballast tank 2 with water, the ballast pump pressure should be approximately 0.7-1.4 MPa.

The open-worked screen 5 should be disposed at right angles with the direction of water flow in order to produce maximum possible shearing action. Further the open-worked screen 5 should have its periphery held fast against the inside surface of the delivery conduit 4. The open-worked screen 5 may be flanged and removably mounted in the de-livery conduit 4 for ease of dismounting and reconditioning.

Figure 4:
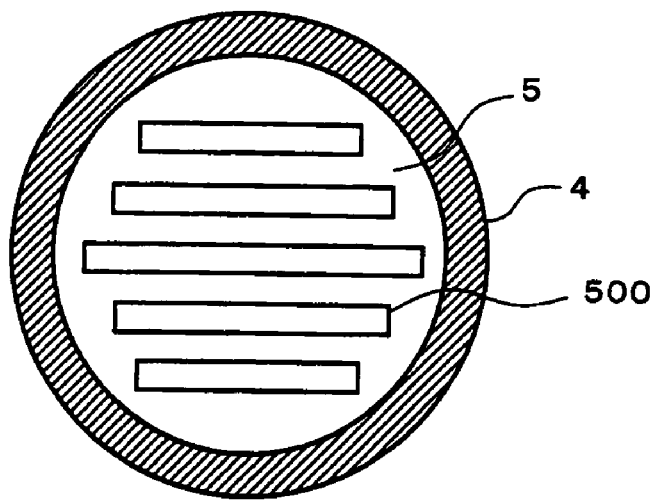
FIG. 4 is a view similar to FIG. 3 but showing an alternative form of open-worked screen.
Figure 5:
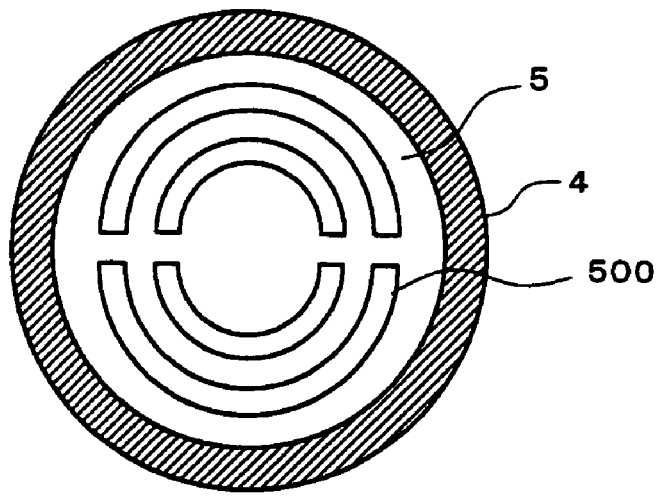
FIG. 5 is also a view similar to FIG. 3 but showing an-other alternative form of open-worked screen.

Various slit arrangements are possible for the open-worked screen 5 within the purview of the disclosed embodiments, the parallel spaced configuration of the straight slits 500 depicted in FIG. 3 being representative of such possible arrangements. There are no limitations to the number of the slits 500. The slits 500 may be either all of the same length as in FIG. 3 or different in length. Thus, in an alternative example pictured in FIG. 4, the slits 500 become progressively longer from the outmost ones toward the middle one. Furthermore, the slits 500 need not be straight but may be curved, bent, or otherwise shaped in various ways. FIG. 5 indicates another alternative example in which the slits 500 are each arcuate and as a whole arranged in concentric circles.

Figure 6:
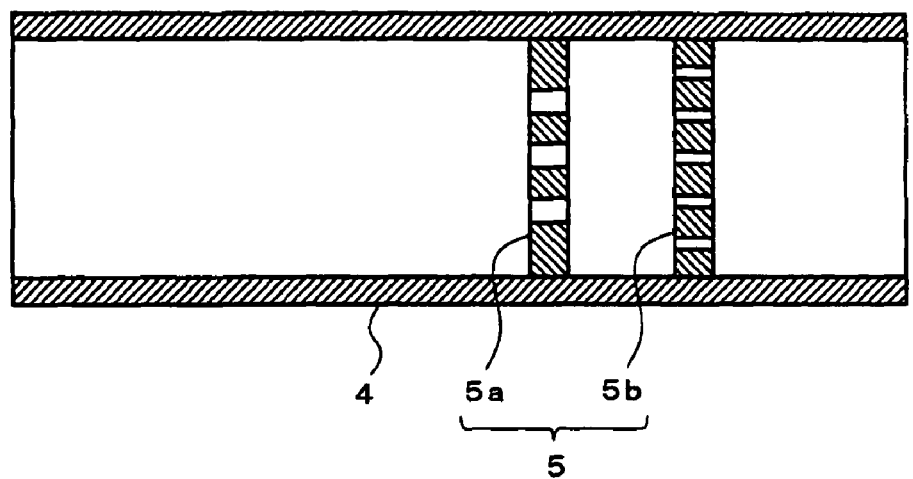
FIG. 6 is a view similar to FIG. 2 but showing a slight modification of the embodiment of FIG. 1.

It is also possible to employ two open-worked screens in succession as at 5a and 5b in FIG. 6 instead of one as in FIG. 1. It will be noted that the slits in the downstream screen 5b are narrower and spaced more closely from one another than are those in the upstream screen 5a.

With reference back to FIG. 1 the delivery conduit 4 is provided with a bypass conduit 6 for ozone introduction into the ballast water after it has been pressurized to 0.7-1.4 MPa. The bypass conduit branches off from the delivery conduit 4 at 600, downstream of the ballast pump 1 and upstream of the open-worked screen 5. Ozone introduction downstream of the ballast pump 1 is designed to protect this pump from the potentially harmful effects of ozone, both structurally and operationally (e.g., cavitation by the intermingling of the water with air).

The bypass conduit 6 is provided with a pressure regulator 601 immediately downstream of the branching point 600. Itself conventional in construction, the pressure regulator 601 is designed to reduce the water pressure to 0.2-0.4 MPa from the 0.7-1.4 MPa delivery pressure of the ballast pump 1 for ozone introduction under a correspondingly less pressure.

The bypass conduit 6 communicates the pressure regulator 601 with an ozone impregnator 602, to which there is also communicatively coupled an ozonizer 603 via an ozone supply conduit 604. The ozonizer 603 conventionally generates and delivers ozone into the ozone impregnator 602 under a pressure of approximately 0.2 MPa. In practice the ozone impregnator 602 may take the form of an ejector, static mixer, line mixer, or any other known machine capable of intermingling a liquid and a gas. The pressure loss by the ozone impregnator 602 should be 0.2-0.3 MPa.

Disposed downstream of the ozone impregnator 602 is a bypass pump 605 whereby the ozone-impregnated water is drawn from the ozone impregnator. A more intimate intermingling of the ozone and water is accomplished as the ozone-impregnated water is thus forcibly drawn from the ozone impregnator 602. The bypass pump 605 delivers the ozone-impregnated water back into the delivery conduit 4 at a point up-stream of the open-worked screen 5. A check valve 606 is installed downstream of the bypass pump 605 in order to prevent reverse flow from the delivery conduit 4.

The amount of ozone relative to the entire amount of ballast water stored should be determined in consideration of: (a) most cost-effective elimination of the microbes that cannot be destroyed by the open-worked screen 5; and (b) minimization of residual ozone in the ballast tank. A currently desired range is 0.5-5.0 parts per million (ozone in grams/ballast water in cubic meters). The amount of water directed into the bypass conduit 6 may be up to 50 percent, at least 20 percent, of the en-tire amount of water being delivered by the ballast pump 1.

It will be appreciated that various disclosed embodiments realize ozone introduction into the water being pumped into the ballast tank by directing part of this water into the bypass conduit 6 and, preliminary to ozone impregnation, reducing the water pressure by means typified by the pressure regulator 601. Such partial ozone treatment of the water also makes possible the use of a smaller ozone impregnator 602, bypass pump 605, and check valve 606.

An additional advantage of this embodiment is that the ozone-impregnated water flows back into the delivery conduit 4 at a point upstream of the open-worked screen 5. As the water subsequently flows turbulently through the open-worked screen 5, the ozone will mingle even more intimately with the water, contributing to a more complete annihilation of the sealife in cooperation with the shearing action of the water.

Second Embodiment

Figure 7:
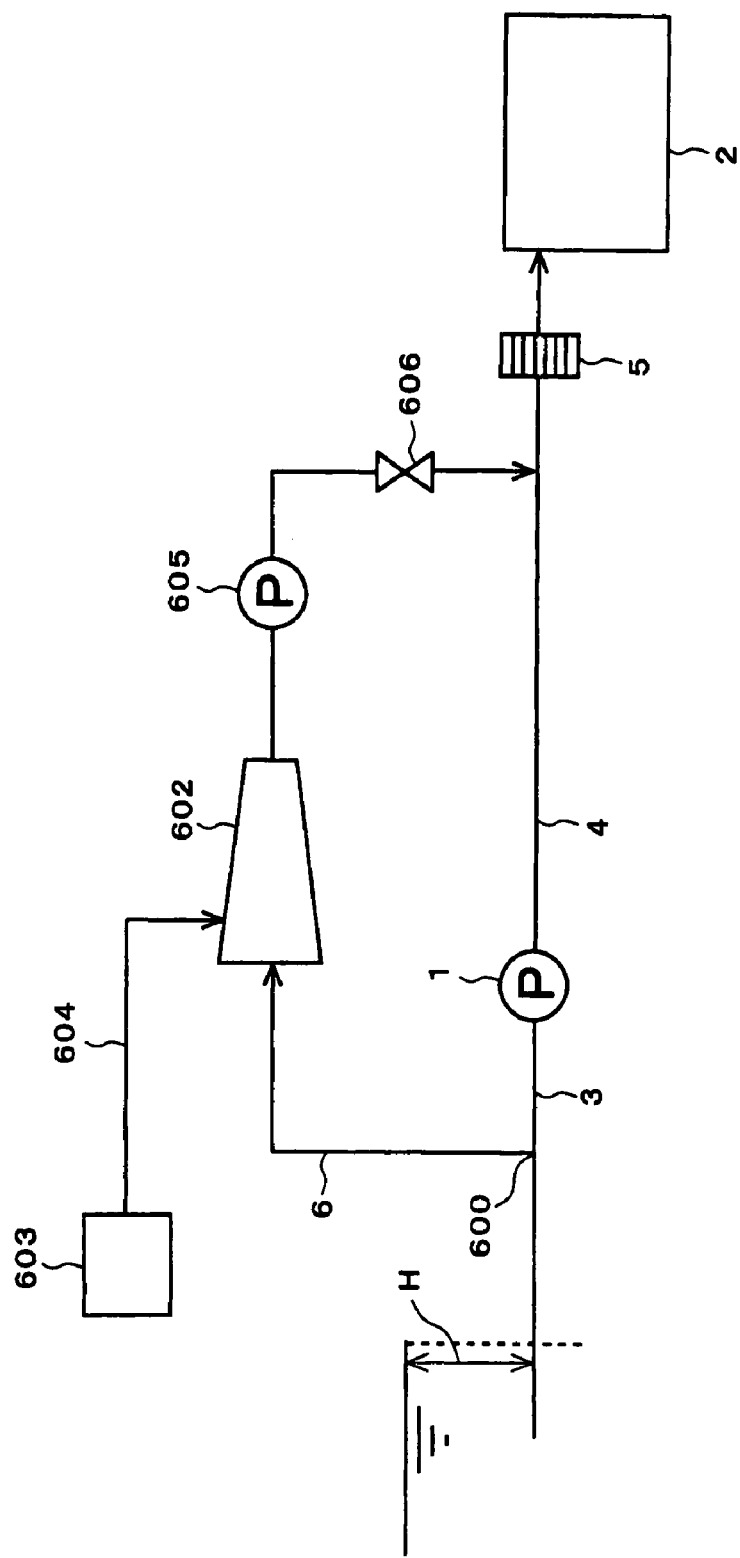
FIG. 7 is a schematic hydraulic diagram of another preferred form of ballast water treatment system according to disclosed embodiments.

FIG. 7 is an illustration of the second embodiment. This embodiment differs from that of FIG. 1 in that the by-pass conduit 6 branches at 600 from the intake conduit 3, that is, at a point upstream of the ballast pump 1, rather than from the delivery conduit 4 downstream of the ballast pump as in the first disclosed embodiment. No pressure regulator is attached to the bypass conduit 6, so that the water is drawn from its source directly into the ozone impregnator 602 under pressure from the bypass pump 605. All the other details of construction are as previously set forth with reference to FIGS. 1-3.

Usually, there is a pressure head H on the suction side of the ballast pump 1, so that this embodiment is advantageous in applications where water can be drawn into and through the ozone impregnator 602 under the force of the bypass pump 605.

Here again the amount of ozone relative to the entire amount of the ballast water stored should be 0.5-5.0 parts per million (ozone in grams/ballast water in cubic meters) for most cost-effective elimination of the microbes that cannot be destroyed by the open-worked screen 5. The amount of water directed into the bypass conduit 6 may be 20-50 percent of the entire amount of water to be eventually stored in the ballast tank 1.

Among the advantages gained by this embodiment over that of FIG. 1 are those accruing from the absence of the pressure regulator from the bypass conduit 6. Ozone impregnation of the bypassing water is nevertheless easy, even if the delivery pressure of the ozonizer 603 is lessened to 0.1 MPa or so.

Third Embodiment

Figure 8:
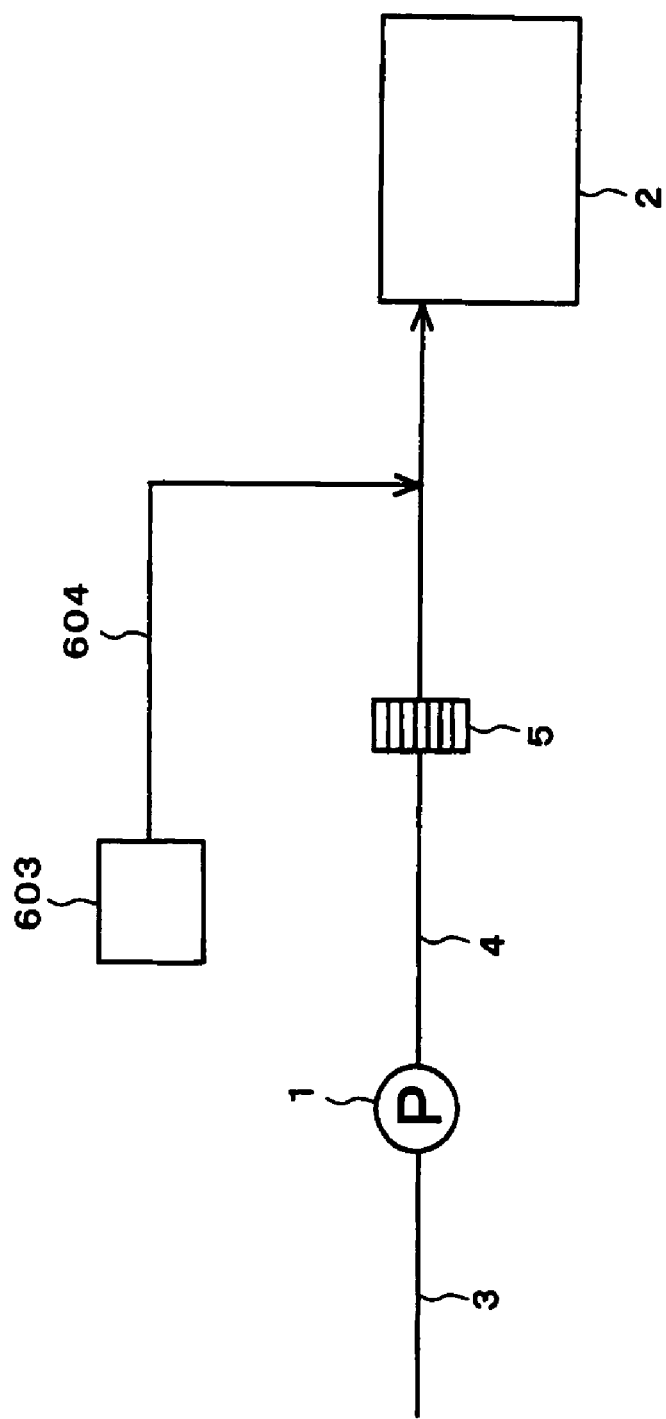
FIG. 8 is a schematic hydraulic diagram of still another preferred form of ballast water treatment system according to disclosed embodiments.

Being a mechanical device, the open-worked screen used in the various embodiments is not capable of destroying of all the aquatic species that may be contained in the water being treated. Some may be killed, and others may be so damaged as to die soon, but there may be still others that are only lightly damaged or not at all. If admitted freely into the ballast tanks, the third group of organ-isms might survive and reproduce themselves within the confines of these tanks. Therefore, to defeat this risk of reproliferation, ozone is reintroduced into the water downstream of the open-worked screen 5 in this third embodiment illustrated in FIG. 8.

Such being the pressure loss of the water as it traverses the open-worked screen 5, the water pressure becomes sufficiently low on the downstream side of this screen to permit easy re-impregnation with ozone. The ozonizer 603 is therefore communicatively coupled to the downstream conduit of the open-worked screen 5 via the ozone supply conduit 604 for introducing ozone into the water after the same has flown through the screen.

Figure 9:
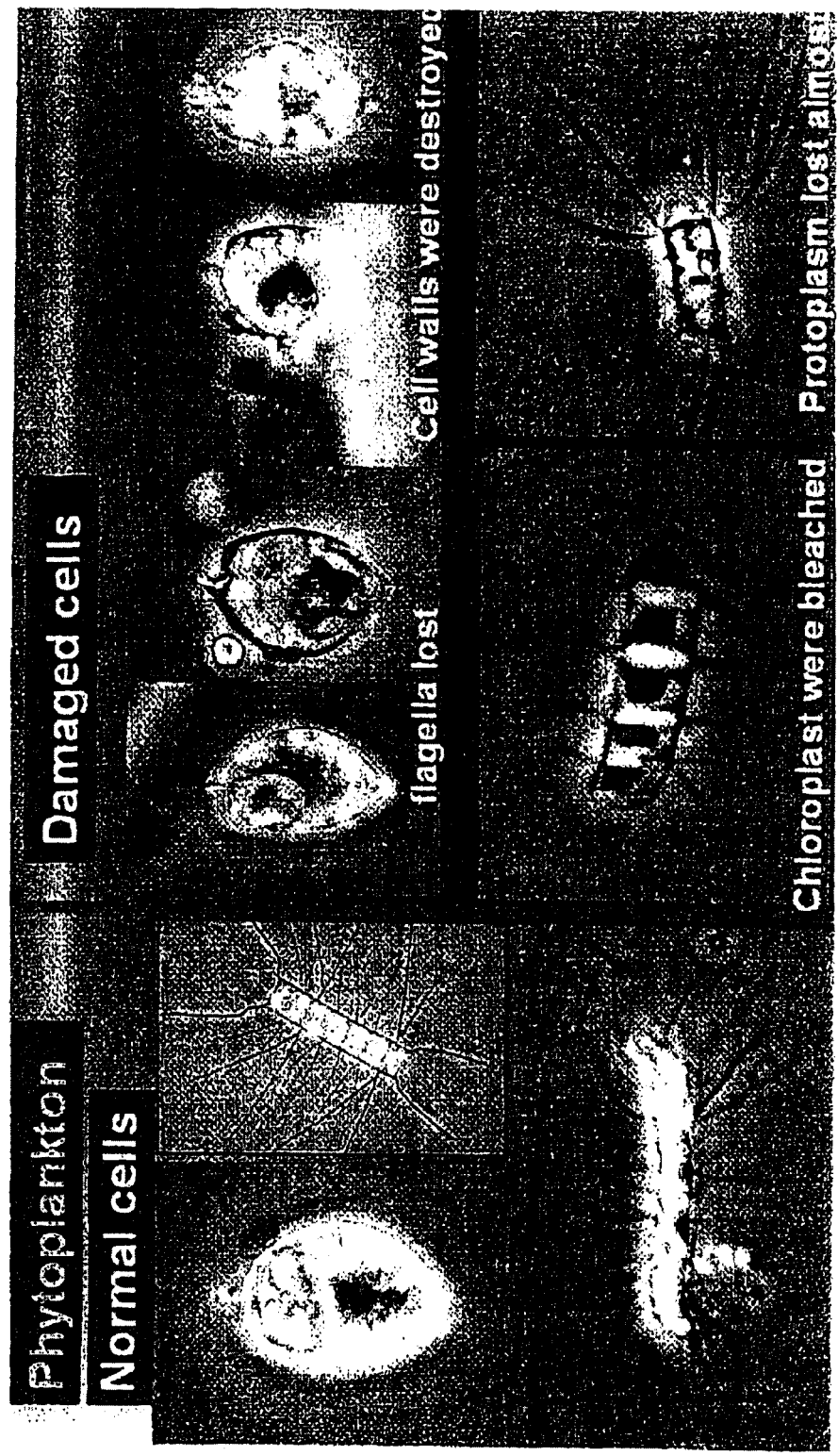
FIG. 9 is a set of photomicrographs showing both damaged and undamaged phytoplanktons.
Figure 10:
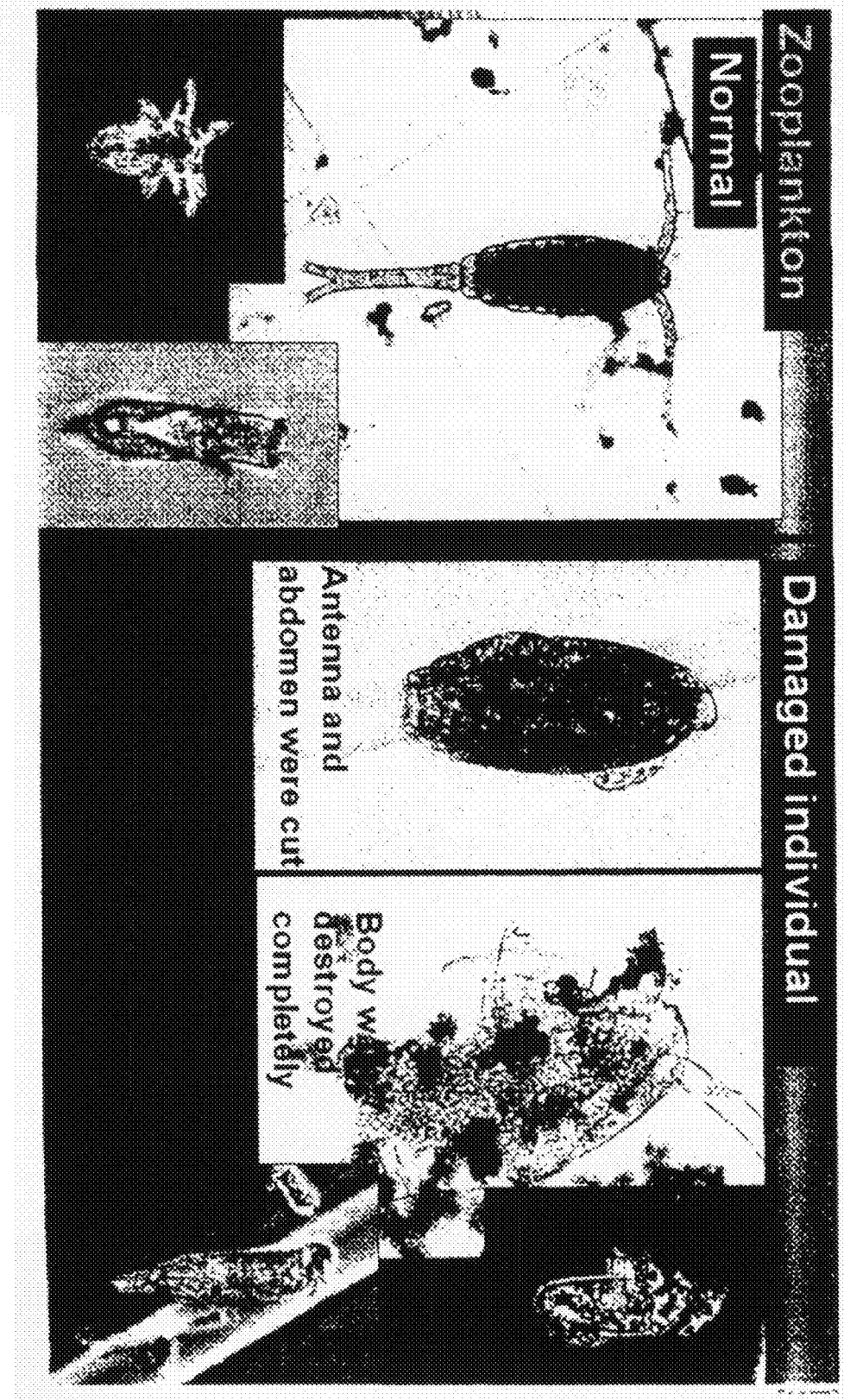
FIG. 10 is another set of photomicrographs showing both damaged and undamaged zooplanktons.

FIGS. 9 and 10 are photomicrographs revealing the phytoplanktons and zooplanktons, respectively, that have traversed the open-worked screen or screens of the foregoing embodiments, either damaged or undamaged by the shearing action. Seen to the left in FIG. 9 are three undamaged phytoplanktons, and to the right are six damaged ones. Likewise, three undamaged zooplanktons are shown to the left in FIG. 10, and four damaged ones to the right in the same figure. It is expected that, treated with ozone as in FIG. 8, the organisms that have been undamaged, or not fatally damaged, by the open-worked screen or screens will be deprived of the likelihood of reproliferation within the ballast tanks.

Fourth Embodiment

Figure 11:
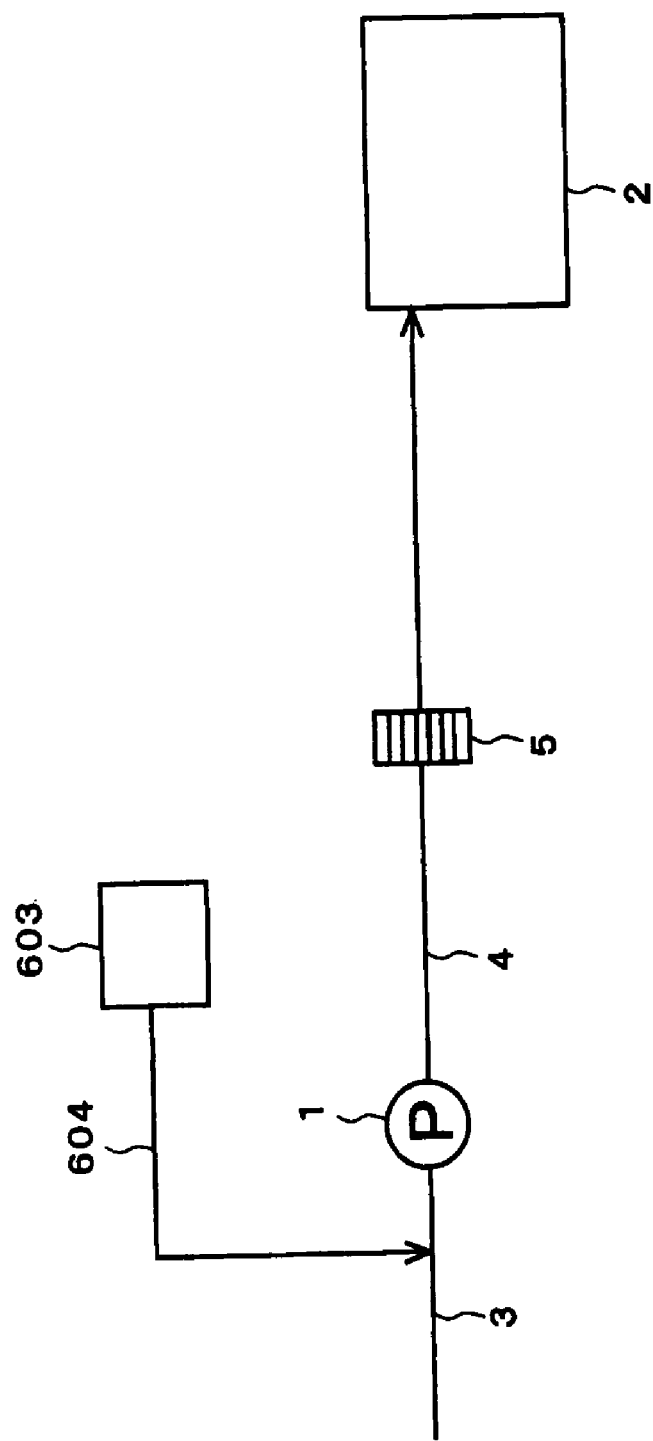
FIG. 11 is a schematic hydraulic diagram of yet another preferred form of ballast water treatment system according to disclosed embodiments.

Some newly built ships are equipped with ozone-proof ballast pumps, which permit intake of a gas-liquid mixture. Suitable for installation in such ships is the physicochemical ballast water treatment system of FIG. 11, in which ozone is delivered from the ozonizer 603 to the intake conduit 3 of the ballast pump 1 by way of the ozone supply conduit 604. The ozone-impregnated water is subsequently forced by the ballast pump 1 through the delivery conduit 4 to the open-worked screen 5 and thence to the ballast tank 2.

This embodiment offers the advantage of an intimate intermingling of ozone and water by both the ballast pump 1 and the open-worked screen 5.

The invention claimed is:

1. A water treatment system for destruction of aquatic organisms and microorganisms that may be contained in water being pumped into a ship's ballast tank, comprising:
   (a) a ballast pump having an intake conduit for drawing water possibly containing aquatic species from a source thereof at a pressure head greater than a predetermined head, and a delivery conduit for delivering the water under pressure falling within a range of 0.7 to 1.4 MPa to a ballast tank;
   (b) an open-worked screen in the delivery conduit having a plurality of slit-like openings having 200-500 micrometers width, for destroying and killing the aquatic species contained in the water by creating shearing action in the water flowing therethrough;
   (c) a bypass conduit branching off from the intake conduit to permit inflow of part of the water being drawn by the ballast pump;
   (d) ozone impregnator means for impregnating with ozone the water flowing through the bypass conduit; and
   (e) a bypass pump positioned downstream of the ozone impregnator means for returning the ozone-impregnated water into the delivery conduit at a point upstream of the open-worked screen.

* * * * *